United States Patent
Subrata et al.

(10) Patent No.: US 12,473,474 B2
(45) Date of Patent: Nov. 18, 2025

(54) ADDITION CURABLE SILICONE ADHESIVE COMPOSITIONS

(71) Applicant: Momentive Performance Materials Inc., Waterford, NY (US)

(72) Inventors: Mandal Subrata, Bangalore (IN); Koki Otashiro, Gunma (JP); Masanori Takanashi, Gunma (JP); Ramasubramanian Narayanan, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 734 days.

(21) Appl. No.: 17/783,667

(22) PCT Filed: Dec. 13, 2019

(86) PCT No.: PCT/US2019/066152
§ 371 (c)(1),
(2) Date: Jun. 9, 2022

(87) PCT Pub. No.: WO2021/118582
PCT Pub. Date: Jun. 17, 2021

(65) Prior Publication Data
US 2023/0047848 A1    Feb. 16, 2023

(51) Int. Cl.
| | |
|---|---|
| C09J 183/04 | (2006.01) |
| C08G 77/12 | (2006.01) |
| C08G 77/20 | (2006.01) |
| C08K 5/5419 | (2006.01) |
| C08K 5/5425 | (2006.01) |
| C08K 5/549 | (2006.01) |

(52) U.S. Cl.
CPC .......... *C09J 183/04* (2013.01); *C08G 77/12* (2013.01); *C08G 77/20* (2013.01); *C08K 5/5419* (2013.01); *C08K 5/5425* (2013.01); *C08K 5/549* (2013.01); *C08G 2170/00* (2013.01); *C09J 2483/00* (2013.01)

(58) Field of Classification Search
None
See application file for complete search history.

(56) References Cited

U.S. PATENT DOCUMENTS

| | | | |
|---|---|---|---|
| 6,124,419 A | 9/2000 | Armstrong et al. | |
| 6,201,092 B1 | 3/2001 | Hiroyasu | |
| 6,780,518 B2* | 8/2004 | Azechi | C08L 83/00 528/33 |
| 8,937,123 B2* | 1/2015 | Kato | C08L 83/04 524/106 |
| 9,567,501 B2* | 2/2017 | Tsuchida | C09J 183/04 |
| 2014/0179863 A1 | 6/2014 | Nobu | |
| 2016/0032102 A1 | 2/2016 | Srikanth et al. | |
| 2019/0005420 A1 | 1/2019 | Fujimoto et al. | |
| 2021/0002483 A1* | 1/2021 | Smith | C08L 83/04 |

FOREIGN PATENT DOCUMENTS

| | | | |
|---|---|---|---|
| CN | 108699421 A | 10/2018 | |
| EP | 2452994 | 5/2012 | |
| JP | 2000080282 | 3/2000 | |
| JP | 2004225053 | 8/2004 | |
| JP | 2013124297 A * | 6/2013 | |
| JP | 2014122271 | 7/2014 | |
| JP | 2021503519 | 2/2021 | |
| WO | 2019099676 | 5/2019 | |
| WO | WO-2019142688 A1 * | 7/2019 | C08G 77/08 |
| WO | WO-2020145249 A1 * | 7/2020 | C08G 77/08 |

OTHER PUBLICATIONS

Machine translation of JP 2013-124297 (no date).*
Huang, Wenrun, "Primer and tackifier for added liquid silicone rubber", Silicone Material, 2005, 19(4) pp. 39-45, 52.
Patent Cooperation Treaty (PCT), International Search Report and Written Opinion for Application PCT/US2019/066152 filed Dec. 13, 2019, mailed Oct. 19, 2020, International Searching Authority, EP.

* cited by examiner

*Primary Examiner* — Marc S Zimmer
(74) *Attorney, Agent, or Firm* — Joseph Waters; McDonald Hopkins LLC

(57) ABSTRACT

A curable silicone adhesive composition comprising a combination of adhesion promoters is shown and described herein. The composition includes a first adhesion promoter selected from a silicon hydride adhesion promoter and a second adhesion promoter selected from an acrylate functional adhesion promoter to provide a silicone material that is curable at relatively low temperatures and shorter time and provides good adhesion to plastics and metal.

28 Claims, No Drawings

ADDITION CURABLE SILICONE ADHESIVE COMPOSITIONS

CROSS REFERENCE TO RELATED APPLICATIONS

This application claims priority to and the benefit under 35 USC 371 of International Patent Application PCT/US2019/066152 filed on Dec. 13, 2019, the disclosure of which is incorporated herein by reference in its entirety.

FIELD OF INVENTION

The present invention relates to curable silicone adhesive compositions, such compositions comprising adhesion promoters, and to the use and application of such curable silicone compositions on various surfaces. In particular, the present invention relates to a low temperature and fast curable silicone adhesive compositions comprising a combination of adhesion promoters with different functionalities and the application of such curable silicone compositions to different types of surfaces.

BACKGROUND

Plastics are replacing conventional materials for the development of next generation light-weight, efficient hybrid power modules, inverters, sensors, and electronic control unit (ECU) and transmission control unit (TCU) systems. Adhesives used in the automobile industry, for example, must be suitable to contribute to design flexibility and long-term reliability under hard operating conditions. Conventional silicone compositions are generally not fully adhesive to plastic materials at lower temperatures. Plastic materials, however, are susceptible to deformation at higher processing temperatures (e.g., around 150° C.). Therefore, adhesive compositions that might require curing at elevated temperatures (e.g., greater than 120° C.) may not be particularly useful for certain applications and limit their use in various industries. Recent attempts to improve bonding of silicone to plastics have included the use of isocyanate-based additives along with an aromatic group containing silicon hydride material (see, e.g., EP 2305765). Other attempts are described in, for example, U.S. Pat. Nos. 8,937,123 and 8,916,646, and Japan Publications 2014-205800 and 2013-241522. These proposed solutions, however, still require heating at temperatures more than 100° C.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is an addition curable silicone adhesive composition which has been found to exhibit good adhesion to a variety of substrates including both plastic and metal substrates, and allow for curing of the composition at relatively low temperatures (e.g., about 100° C. or lower) and shorter time (e.g., about 5 to 15 min)

In one aspect, provided is a curable silicone composition comprising: (a) an alkenyl functional silicone; (b) a silicone based cross linker; (c) a first adhesion promoter selected from a silicon hydride containing adhesion promoter; (d) a second adhesion promoter selected from an acrylate functional adhesion promoter; (e) optionally, a silane; (f) optionally, a filler (g) an inhibitor and (h) a catalyst.

In one embodiment, the first adhesion promoter is selected from a compound of the formula (I):

where $R^1$ and $R^2$ are a C1-C30 divalent hydrocarbon; a C2-C20 divalent hydrocarbon; a C4-C10 divalent hydrocarbon; or a C1-C4 divalent hydrocarbon; $Z^1$ and $Z^2$ are independently:

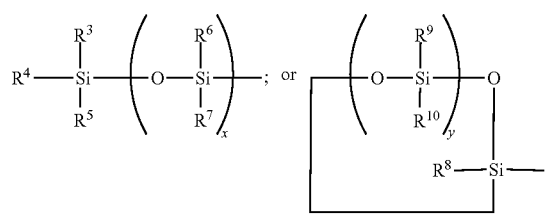

where $R^3$, $R^4$, $R^5$, $R^6$, $R^7$, $R^8$, $R^9$, and $R^{10}$ are independently chosen from H, a C1-C10 alkyl, or —OR11, where $R^{11}$ is a C1-C10 alkyl, and at least one of $R^3$, $R^4$, $R^5$, $R^6$, $R^7$, $R^8$, $R^9$, and/or $R^{10}$ are H;

X is 1 to 10;

Y is 2 to 10; and

Ar is an aromatic group.

In one embodiment, the aromatic group Ar may be chosen from a C6-C30 arylene group, or a group of the formula —$Ar^1$—X—$Ar^2$—, where $Ar^1$ and $Ar^2$ are independently chosen from a monocyclic divalent aryl group and X is a bridging group.

In one embodiment, $Ar^1$ and $Ar^2$ are independently chosen from a C6-C30 arylene group, X is chosen from a bond connecting $Ar^1$ and $Ar^2$, a C1-C30 divalent hydrocarbon group, a C5-C30 divalent cyclic hydrocarbon group, —O—, —S—, —S(O)—, —S(O)$_2$—, or —C(O)—.

In one embodiment, $Ar^1$—X—$Ar^2$ is a group of the formula:

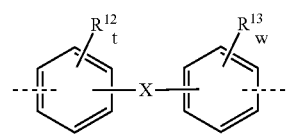

where X is chosen from a bond connecting $Ar^1$ and $Ar^2$, a C1-C30 divalent hydrocarbon group, a C5-C30 divalent cyclic hydrocarbon group, —O—, —S—, —S(O)—, —S(O)$_2$—, or —C(O)—;, $R^{12}$ and le are the same or different from each other or within the ring to which they are attached and are chosen from hydrogen, a C1-C10 alkyl, C1-C10 alkoxy, a C2-C8 alkenyl, a C2-C8 alkenyloxy, a C3-C8 cycloalkyl, a C3-C8 cycloalkoxy, a C6-C10 aryl, a C6-C10 aryloxy, a C7-C10 aralkoxy, a C7-C12 alkylaryl, or a C7-C12 alkylaryloxy, and t and w are 0-4, wherein when t or w are less than 4, the unspecified valence or valencies is occupied by hydrogen.

In one embodiment, —Ar¹—X—Ar² is of the formula:

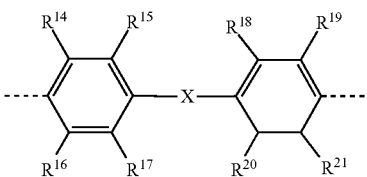

where X is as described above, and $R^{14}$, $R^{15}$, $R^{16}$, $R^{17}$, $R^{18}$, $R^{19}$, $R^{20}$, and $R^{21}$ are independently selected from hydrogen, a C1-C10 alkyl, a C3-C8 cycloalkyl, or a C6-C10 aryl.

In one embodiment, X is —C($R^{22}$)$_2$— where $R_{22}$ is independently selected from hydrogen, a C1-C10 alkyl, a C3-C8 cycloalkyl, or a C6-C10 aryl.

In one embodiment, $Z^1$ and $Z^2$ in Formula (I) are:

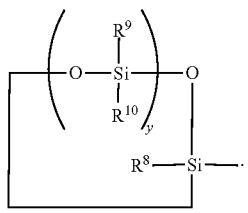

In one embodiment of the curable silicone composition of any previous embodiment, O—Ar—O in Formula (I) is:

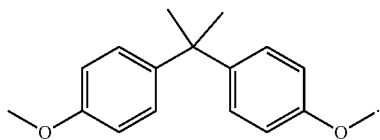

In one embodiment, the first adhesion promoter is selected from a compound of the formula (VI):

$$R^{23}—SiR^{24}_r(OR^{25})_{3-r} \quad (VI)$$

where $R^{23}$ is a hydrogen or hydride functional group; $R^{24}$ is independently selected from a C1-C10 hydrocarbon group; each $R^{25}$ is independently selected from a C1-C10 hydrocarbon; and r=0, 1, or 2

In one embodiment, $R^{23}$ is a cyclic hydrido siloxane containing group of the formula:

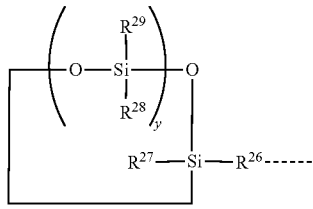

where $R^{27}$, $R^{28}$, and $R^{29}$ are independently chosen from H, a C1-C10 alkyl, or —O$R^{30}$, where $R^{54}$ is a C1-C10 alkyl, and at least one of $R^{27}$, $R^{28}$, and $R^{29}$ are H; and $R^{26}$ is a C1-C30 hydrocarbon; a C6-C30 aryl group; an alkyl acrylate group; an alkyl carboxylate group; or an ester group.

In one embodiment, $R^{23}$ is a cyclic hydrido siloxane of formula (III), and $R^{26}$ is an organosilicon group having a side chain bonded to a silicon atom and represented by the following formula:

$$Q^1-C(O)—O-Q^2$$

wherein $Q^1$ represents a linear or branched alkylene group that forms a carbon chain having two or more carbon atoms between the silicon atom and an ester bond, in embodiments 2-20 carbon atoms, 4-15 carbon atoms, or 6-10 carbon atoms, and $Q^2$ represents a linear or branched alkylene group that forms a carbon chain having three or more carbon atoms between an oxygen atom and a silicon atom in embodiments 2-20 carbon atoms, 4-15 carbon atoms, or 6-10 carbon atoms, in a side chain: $SiR^{24}_r(OR^{25})_{3-r}$.

In one embodiment, the first adhesion promoter (d) comprises (i) an adhesion promoter of formula (I), and (ii) an adhesion promoter of formula (VI) in accordance with any of the previous embodiments.

In one embodiment of the curable composition in accordance with any previous embodiment, the second adhesion promoter is selected from: (i) a compound of the formula CH2=CR³⁰C(O)O—R³¹ where $R^{30}$ is selected from H or a C1-C10 alkyl; and $R^{31}$ is selected from a C1-C20 alkyl, a C3-C20 cycloalkyl, a C6-C30 aryl, a fused C6-C30 cycloalkyl, a C7-C30 arylalkyl, a bridged C7-C30 cycloalkyl, a C1-C20 heteroalkyl, or a cyclic C3-C20 heteroalkyl, where the $R^{31}$ groups may optionally contain a heteroatom or a heteroatom-containing functional group; and/or (ii) a compound of the formula CH2=CR³²C(O)O—R³⁴—O(O) CR³³C=CH₂ where $R^{32}$ and $R^{33}$ are independently selected from H or a C1-C10 alkyl; and $R^{34}$ is selected from a C1-18 alkylene group, a C3-18 cycloalkylene group, a fused C6-18 cycloalkylene group, or a group of the formula —B¹—W—B²— wherein B¹ and B² are the same or different C1-6 alkylene group and W is a C3-12 cycloalkylene group, a C6-16 arylene group, a C6-C30 bridged cycloalkylene group, or a C12-C36 fused aromatic group.

In one embodiment of the curable composition in accordance with any previous embodiment, the first adhesion promoter is present in an amount of from about 0.1 wt. % to about 10 wt. % based on the total weight of the composition; and the second adhesion promoter is present in an amount of from about 0.1 wt. % to about 10 wt. % based on the total weight of the composition.

In one embodiment of the curable composition in accordance with any previous embodiment, the first adhesion promoter and the second adhesion promoter are present in an amount such that there is a molar ratio of Si—H to vinyl groups of from 1.5:1 to 2.5:1.

In one embodiment of the curable composition in accordance with any previous embodiment, the first adhesion promoter and the second adhesion promoter are present in an amount such that there is a molar ratio of Si—H to vinyl groups of 2:1.

In one embodiment of the curable composition in accordance with any previous embodiment, the alkenyl silicone is chosen from a compound of the formula $M^1_a M^2_b D^1_c D^2_d T^1_e T^2_f Q_g$ wherein:

$$M^1 = R^{35}R^{36}R^{37}SiO_{1/2}$$

$$M^2 = R^{38}R^{39}R^{40}SiO_{1/2}$$

$$D^1 = R^{41}R^{42}SiO_{2/2}$$

$$D^2 = R^{43}R^{44}SiO_{2/2}$$

$T^1 = R^{45}SiO_{3/2}$ $T^2 = R^{46}SiO_{3/2}$ $Q = SiO_{4/2}$ where $R^{35}$, $R^{36}$, $R^{37}$, $R^{39}$, $R^{40}$, $R^{41}$, $R^{42}$, $R^{44}$, and $R^{45}$ are independently chosen from a C1-C30 hydrocarbon, a C6-C30 aromatic group, or C1-C30 alkoxy group; $R^{38}$, $R^{43}$, and $R^{46}$ are independently chosen from a C1-C30 hydrocarbon, a C6-C30 aromatic group, C1-C30 alkoxy group, or a C2-C30 alkenyl group, with the proviso that one or more of $R^{38}$, $R^{43}$, and/or $R^{46}$ are selected from a C2-C30 alkenyl group; the subscripts a, b, c, d, e, f, g, are zero or positive subject to the following limitations: 2<a+b+c+d+e+f+g<2000, b+d+f>0.

In one embodiment, the alkenyl silicone comprises a mixture of alkenyl silicones chosen from (i) a first alkenyl function silicone having the formula $M^2D^1_cM^2$ where c is from about 5 to about 1000; and a (ii) second alkenyl functional silicone having the formula $M^2D^1_{c'}M^2$ where c' is from about 500 to about 1500.

In one embodiment, the alkenyl silicone is a branched polyorganosiloxane comprising a plurality of $Q_g$ units and one or more $M^2$ units.

In one embodiment of the curable composition in accordance with any previous embodiment, the silicone hydride crosslinker is chosen from a compound of the formula: $M^3_hM^4_iD^3_jD^4_kT^3_mT^4_nQ_o$ wherein:

$M^3 = R^{47}R^{48}R^{49}SiO_{1/2}$ $M^4 = R^{50}R^{51}R^{52}SiO_{1/2}$ $D^3 = R^{53}R^{54}SiO_{2/2}$ $D^4 = R^{55}R^{56}SiO_{2/2}$ $T^3 = R^{57}SiO_{3/2}$ $T^4 = R^{58}SiO_{3/2}$ $Q = SiO_{4/2}$ where $R^{47}$, $R^{48}$, $R^{49}$, $R^{53}$, $R^{54}$, $R^{57}$, and are independently chosen from a C1-C30 hydrocarbon, a C6-C30 aromatic group, or C1-C30 alkoxy group; $R^{50}$, $R^{51}$, $R^{52}$, $R^{55}$, $R^{56}$, and $R^{58}$ are independently chosen from hydrogen, a C1-C30 hydrocarbon, a C6-C30 aromatic group, C1-C30 alkoxy group, or a C2-C30 alkenyl group, with the proviso that one or more of $R^{50}$, $R^{51}$, $R^{52}$, $R^{55}$, $R^{56}$, and/or $R^{58}$ are hydrogen; the subscripts a, b, c, d, e, f, g, are zero or positive subject to the following limitations: 1<h+i+j+k+m+n+o<100, i+k+n>0.

In one embodiment of the curable composition in accordance with any previous embodiment, the filler (0 is present in an amount of from about 1 weight % to about 50 weight % based on the total weight of the curable silicone composition.

In one embodiment, the filler is selected from precipitated calcium carbonate, colloidal calcium carbonate, fumed silica, precipitated silica, silica gel, hydrophobized silica, a hydrophobized silica gelm crushed quartz, ground quartz, alumina, aluminum hydroxide, titanium hydroxide, diatomaceous earth, iron oxide, carbon black, graphite, a clay.

In another aspect, provided is a cured silicone material formed from the composition of any of the previous aspects and embodiments.

In still another aspect, provided is a method of forming an adhesive coating on a substrate comprising applying a curable composition of any of the previous aspects and embodiments to a surface of a substrate, and heating the composition at a temperature of about 80° C. to about 100° C.

In one embodiment, the composition is cured over a period of 5 minutes to about 15 minutes.

In one embodiment, the method comprises heating the composition at a temperature of about 100° C. for 5 minutes.

In one embodiment of the method of any previous embodiment, the substrate is chosen from a plastic material, metal, metal alloys, metallized plastic, and/or coated or painted metal.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, the term:

"alkyl" includes straight, branched, and cyclic monovalent hydrocarbon groups, which may be substituted with a heteroatom or heteroatom containing group;

"alkylene" includes straight, branched, and cyclic divalent hydrocarbon groups, which may be substituted with a heteroatom or heteroatom containing group;

"aryl" includes any monovalent aromatic hydrocarbon group, which may be substituted with a heteroatom or heteroatom containing group; this term also includes fused systems containing an aromatic group;

"arylene" includes any divalent aromatic hydrocarbon group, which may be substituted with a heteroatom or heteroatom containing group this term also includes fused systems containing an aromatic group;

"aralkyl" include straight, branched, and cyclic monovalent hydrocarbon groups substituted with an aryl substituent;

"cyclo" or "cyclic" alkyl includes a monovalent cyclic hydrocarbon and includes, free cyclic groups, bicyclic groups, tricyclic groups, and higher cyclic structures, as well as bridged cyclic groups, fused cyclic groups, and fused cyclic groups containing at least one bridged cyclic group;

"cyclo" or "cyclic" alkylene includes a divalent cyclic hydrocarbon and includes, free cyclic groups, bicyclic groups, tricyclic groups, and higher cyclic structures, as well as bridged cyclic groups, fused cyclic groups, and fused cyclic groups containing at least one bridged cyclic group;

"hetero" as used to refer to an atom or in conjunction with another group includes atom or group containing an atom such as oxygen, nitrogen, sulfur, silicon, phosphorus, boron, etc.

Provided is an addition curable silicone adhesive composition comprising a combination of adhesion promoters. In particular, provided is a curable silicon composition employing a silicon-hydride based adhesion promotor and an acrylate functional adhesion promotor. The present compositions, employing such a combination of adhesion promoters, exhibit very fast curing and fast manifestation of adhesion of siloxane based curable compositions to a substrate such as those formed from or having a plastic surface. The present compositions, employing such a combination of adhesion promoters, may provide curable silicone compositions that exhibit good adhesion on a metal such as aluminum as well as different types of plastics surfaces (e.g., PBT, PC and PPS), while exhibiting fast curing (about 5 to 15 min) at low temperatures (about 100° C. or lower).

In one aspect, provided is a curable silicone composition comprising: (a) an alkenyl functional silicone; (b) a silicone based cross linker; (c) a first adhesion promoter selected from a silicon hydride containing adhesion promoter; (d) a second adhesion promoter selected from an acrylate functional adhesion promoter; (e) optionally, a silane; (f) optionally, a filler (g) an inhibitor and (h) a catalyst. The combination of the silicon hydride-based adhesion promoters (first adhesion promoter) with the acrylate functional adhesion promoter (second adhesion promoter) have been found to provide good adhesion to a broad range of surfaces and cure at relatively low temperatures (100° C. or lower) in a short period of time (e.g., 5 to 15 minutes).

The first adhesion promoter (c) is chosen from a silicon hydride-based adhesion promoter having one or more Si—H functional groups. The silicon hydride-based adhesion promoter may contain the Si—H functionality as part of a linear chain, or a branched group, or it may be part of a cyclic group. In one embodiment, the Si—H functional portion of the first adhesion promoter is provided as a cyclic silane group. In one embodiment, the first adhesion promoter is an aromatic containing silicon hydride type material.

In one embodiment, the first adhesion promoter is a compound of the formula:

$$Z^1—R^1—O—Ar—O—R^2—Z^2 \quad (I)$$

where $R^1$ and $R^2$ are a C1-C30 divalent hydrocarbon; a C2-C20 divalent hydrocarbon; a C4-C10 divalent hydrocarbon; or a C1-C4 divalent hydrocarbon; $Z^1$ and $Z^2$ are independently:

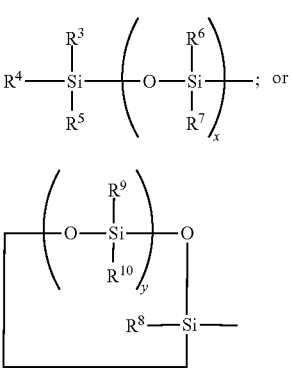

where $R^3$, $R^4$, $R^5$, $R^6$, $R^7$, $R^8$, $R^9$, and $R^{10}$ are independently chosen from H, a C1-C10 alkyl, or —$OR^{11}$, where is a C1-C10 alkyl, and at least one of $R^3$, $R^4$, $R^5$, $R^6$, $R^7$, $R^8$, $R^9$, and/or $R^{10}$ is H;

x is 1 to 10;
y is 2 to 10; and
Ar is an aromatic group.

The aromatic group Ar may be chosen from a C6-C30 arylene group, or a group of the formula —$Ar^1$—X—$Ar^2$—, where $Ar^1$ and $Ar^2$ are independently chosen from a monocyclic divalent aryl group and X is a bridging group. $Ar^1$ and $Ar^2$ may be independently chosen from a C6-C30 arylene group. X may be a bond connecting $Ar^1$ and $Ar^2$, a C1-C30 divalent hydrocarbon group, a C5-C30 divalent cyclic hydrocarbon group, —O—, —S—, —S(O)—, —S(O)2—, —C(O)—. Non-limiting examples of suitable bridging groups X include methylene, cyclohexyl-methylene, 2[2.2.1]-bicycloheptylidene, ethylidene, isopropylidene, neopentylidene, cyclohexylidene, cyclopentadecylidene, cyclododecylidene, and adamantylidene.

In one embodiment, $Ar^1$—X—$Ar^2$ is a group of the formula:

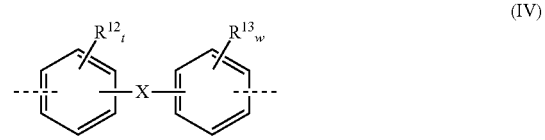

where X is as described above, $R^{12}$ and $R^{13}$ are the same or different from each other or within the ring to which they are attached and are chosen from hydrogen, a C1-C10 alkyl, C1-C10 alkoxy, a C2-C8 alkenyl, a C2-C8 alkenyloxy, a C3-C8 cycloalkyl, a C3-C8 cycloalkoxy, a C6-C10 aryl, a C6-C10 aryloxy, a C7-C10 aralkoxy, a C7-C12 alkylaryl, or a C7-C12 alkylaryloxy, and t and w are 0-4, wherein when t or w are less than 4, the unspecified valence or valencies is occupied by hydrogen.

In one embodiment, —$Ar^1$—X—$Ar^2$ is of the formula:

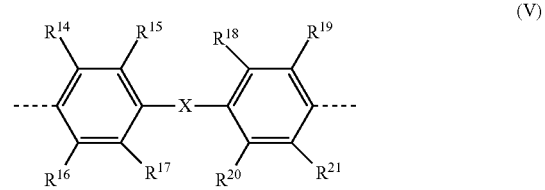

where X is as described above, and $R^{14}$, $R^{15}$, $R^{16}$, $R^{17}$, $R^{18}$, $R^{19}$, $R^{20}$, and $R^{21}$ are independently selected from hydrogen, a C1-C10 alkyl, a C3-C8 cycloalkyl, or a C6-C10 aryl. In one embodiment, X is —$C(R^{22})_2$— where $R_{22}$ is independently selected from hydrogen, a C1-C10 alkyl, a C3-C8 cycloalkyl, or a C6-C10 aryl. In one embodiment, the —O—Ar—O—portion of the compound is of the formula:

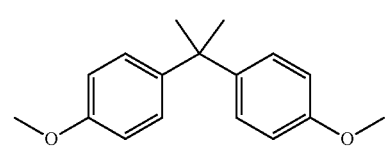

Examples of other suitable groups for the Ar group include, but are not limited to:

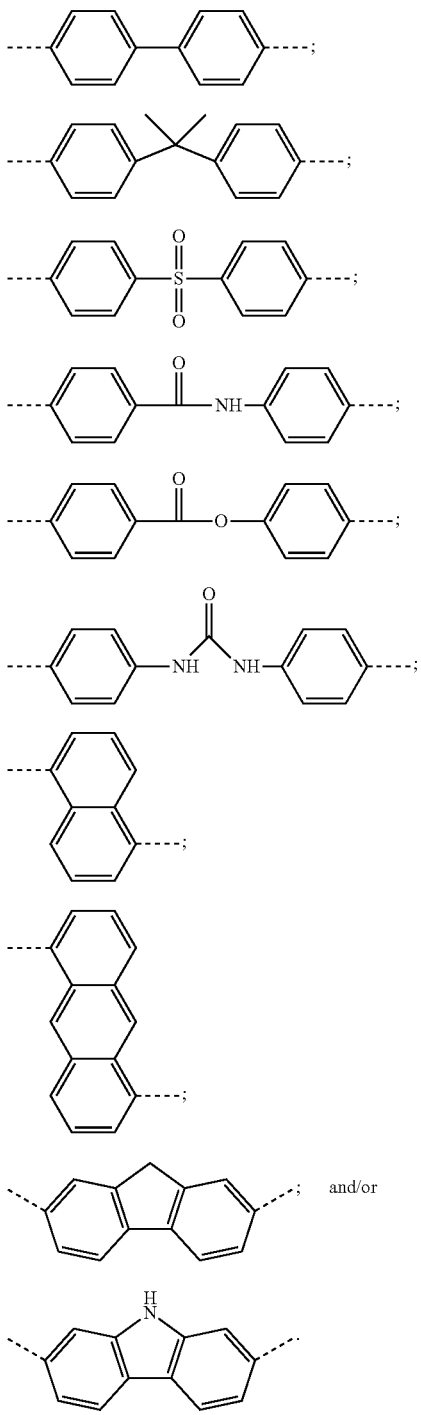 and/or

The silicon hydride-based adhesion promoters of Formula (I) may be derived from dihydroxy aromatic compounds. The dihydroxy aromatic compounds may be of the formula HO—Ar—OH, where Ar is as described above. For the sake of brevity, the description of the Ar groups is not reproduced. Some illustrative, non-limiting examples of suitable dihydroxy aromatic compounds to form the adhesion promoters include, but are not limited to, the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenypethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy -3-bromophenyl) propane, 1,1-bis(hydroxyphenyl)cyclopentane, 1,1-bis(4-hydroxyphenyl)cyclohexane, 1,1-bis(4-hydroxy-3methyl phenyl)cyclohexane 1,1-bis(4-hy droxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3 -isopropyl-4 -hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3 -allyl-4-hydroxyphenyl)propane, 2,2-bis(3-methoxy -4-hy droxyphenyl)propane, 2,2-bis(4-hydroxyphenyl)hexafluoroprop ane, 1,1-dichloro-2,2-bis(4-hydroxyphenyl)ethylene, 1,1-dibromo-2,2 -bis(4-hydroxyphenyl)ethylene, 1,1-dichloro-2,2-bis(5-phenoxy -4-hydroxyphenyl)ethylene, 4,4'-dihydroxybenzophenone, 3, 3-bis(4-hydroxyphenyl)-2-butanone, 1, 6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethyl spiro(bis)indane("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy -9,10-dimethylphenazine, 3,6-dihydroxydibenzofuran, 3,6-dihydroxydibenzothiophene, and 2,7-dihydroxycarbazole, and the like, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3, 5,6-tetramethyl hydroquinone, 2,3,5,6-tetra-t-butyl hydroquinone, 2,3,5,6-tetrafluoro hydroquinone, 2,3,5,6-tetrabromo hydroquinone, as well as combinations comprising at least one of the foregoing dihydroxy aromatic compounds.

The silicone hydride-based adhesion promoters of formula (I) may be formed by any suitable method. In embodiments, the silicone hydride-based adhesion promoter is formed by reacting the dihydroxy aromatic compound (HO—Ar—OH) with an alkenyl halide to a compound with a formula of the formula $R^{1'}$—O—Ar—O—$R^{2'}$ where $R^{1'}$ and $R^{2'}$ are each an alkenyl terminal hydrocarbon, and then reacting that compound with a hydrido siloxane via a hydrosilylation type reaction. Any suitable hydrosilylation catalyst (e.g., platinum-based catalysts like Karstedt's or Ashby's catalysts, or others) may be used to promote the reaction of the alkenyl containing compounds with the hydrido siloxanes.

In one embodiment, the first adhesion promoter is a hydride functional alkoxy silane of the formula:

$$R^{23}\text{—SiR}^{24}_r(OR^{25})_{3-r} \qquad \text{(VI)}$$

where $R^{23}$ is a hydrogen or hydride functional group; $R^{24}$ is independently selected from a C1-C10 hydrocarbon group; each $R^{25}$ is independently selected from a C1-C10 hydrocarbon; and r=0, 1, or 2.

Examples of substituent $R^{24}$ and $R^{25}$ groups include, but are not limited to, alkyl groups such as methyl, ethyl, n-propyl, isopropyl, n-butyl, t-butyl, pentyl, hexyl, octyl, and decyl; alkenyl groups such as 2-propenyl, hexenyl, and octenyl; aralkyl groups such as benzyl and phenethyl; aryl groups such as phenyl, tolyl, and xylyl.

Specific examples of the hydrido (hydrocarbonoxy)silane include trialkoxysilanes, trialkenoxysilanes, and triaryloxysilanes. Examples of trialkoxysilanes include trimethoxysilane, triethoxysilane, tri-n-propoxysilane, triisopropoxysilane, tributoxysilane, triisopropenoxysilane, and triphenoxysilane. Examples of dialkoxysilanes, dialkenoxysilanes, and diaryloxysilanes include methyldimethoxysilane, methyldiethoxysilane, methyldi-n-propoxysilane, methydiisopropenoxysilane, methyldiphenoxysilane, ethyldimethoxysilane, ethyldiethoxysilane, n-propyldimethoxysilane, n-propyldiethoxysilane, 3,3,3-trifluoropropyldimethoxysilane, 3,3,3-trifluoropropyldiethoxysilane, n-hexyldimethoxysilane, n-hexyldiethoxysilane, n-octyldimethoxysilane, n-octyldiethoxysilane, benzyldimethoxysilane, benzyldiethoxysilane, phenethyldimethoxysilane, phenethyldiethoxysilane, phenyldimethoxysilane, and phenyldiethoxysilane. Examples of monoalkoxysilanes, monoalkenoxysilanes, and monoaryloxysilanes include dimethylmethoxysilane, dimethylethoxysilane, dimethyl-n-propoxysilane, dimethylisopropenoxysilane, dimethylphenoxysilane, diethylmethoxysilane, methylethylethoxysilane, n-propyl(methyl)methoxysilane, n-propyl(methyl)ethoxysilane, 3,3,3-trifluoropropyl(methyl)methoxysilane, bis (3,3,3-trifluoropropyl)ethoxysilane, n-hexyl(methyl)methoxysilane, di(n-hexyl)ethoxysilane, n-octyl(methyl)methoxysilane, di(n-octyl)ethoxysilane, benzyl(methyl)methoxysilane, phenethyl(methyl) methoxysilane, and methylphenylmethoxysilane. Examples of hydrido (hydrocarbonoxy)silanes with mixed alkoxy groups, alkenoxy groups, aralkyloxy groups, and aryloxy groups include diethoxypropenoxysilane, dimethoxyphenoxysilane, diphenoxypropenoxysilane, and methylmethoxyphenethoxysilane.

In embodiments, $R^{23}$ is a cyclic hydrido siloxane containing group of the formula:

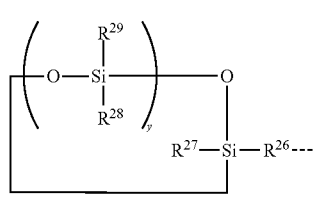

(VII)

where $R^{27}$, $R^{28}$, and $R^{29}$ are independently chosen from H, a C1-C10 alkyl, or —$OR^{30}$ where $R^{54}$ is a C1-C10 alkyl, and at least one of $R^{27}$, $R^{28}$, and $R^{29}$ are H; and $R^{26}$ is a C1-C30 hydrocarbon; a C6-C30 aryl group; an alkyl acrylate group; an alkyl carboxylate group; or an ester group. In one embodiment, the hydride functional alkoxy silane is of the formula $R^{23}$—$SiR^{24}_r(OR^{25})_{3-r}$, where $R^{23}$ is a cyclic hydrido siloxane of formula (VII), $R^{26}$ is a C1-C30 hydrocarbon; a C6-C30 aryl group; an alkyl acrylate group; an alkyl carboxylate group; or an ester group, and r is 0 such that the compound includes a trialkoxysilyl group.

In one embodiment, $R^{23}$ is a cyclic hydrido siloxane of formula (VII), and $R^{26}$ is an organosilicon group having a side chain bonded to a silicon atom and represented by the following formula $$Q^1\text{-}C(O)\text{—}O\text{-}Q^2 \qquad (VIII)$$

wherein:
$Q^1$ represents a linear or branched alkylene group that forms a carbon chain having two or more carbon atoms between the silicon atom and an ester bond, in embodiments 2-20 carbon atoms, 4-15 carbon atoms, or 6-10 carbon atoms, and $Q^2$ represents a linear or branched alkylene group that forms a carbon chain having three or more carbon atoms between an oxygen atom and a silicon atom in embodiments 2-20 carbon atoms, 4-15 carbon atoms, or 6-10 carbon atoms, in a side chain: $SiR^{24}_r(OR^{25})_{3-r}$.

It will be appreciated that the composition can employ a single type of compound as the first adhesion promoter, or it can include mixtures or combinations of different compounds. For example, the composition could include (i) two or more compounds falling under Formula (I); (ii) two or more compounds falling under Formula (VI); or (iii) at least one compound falling under Formula (I) and at least one compound falling under Formula (VI); etc.

The first adhesion promoter can be present in the composition in an amount of from about 0.1% to about 10%; from about 0.2% to about 7.5%; from about 0.5% to about 5%; or from about 1% to about 2.5% by weight based on the total weight of the composition.

The second adhesion promoter (d) is chosen from an acrylate functional adhesion promoter. The acrylate functional adhesion promoter can be selected from a monoacrylate, a diacrylate, or a mixture of two or more thereof In one embodiment, the second adhesion promoter is chosen from a monoacrylate of the formula:

$$CH2=CR^{30}C(O)O\text{—}R^{31} \qquad (IX)$$

where $R^{30}$ is selected from H or a C1-C10 alkyl; and $R^{31}$ is selected from a C1-C20 alkyl, a C3-C20 cycloalkyl, a C6-C30 aryl, a fused C6-C30 cycloalkyl, a C7-C30 arylalkyl, a bridged C7-C30 cycloalkyl, a C1-C20 heteroalkyl, or a cyclic C3-C20 heteroalkyl, where the $R^{31}$ groups may optionally contain a heteroatom or a heteroatom-containing functional group. In one embodiment, $R^{30}$ is H, methyl, or ethyl. In one embodiment, $R^{31}$ is an aromatic containing group. In one embodiment, $R^{31}$ is substituted with a silane or siloxane group. In one embodiment, $R^{31}$ is represented by:

—$R^{31a}$—$Si(OR^{31b})_3$ where $R^{31a}$ is selected from a C1-C20 alkylene, a C3-C20 cycloalkylene, a C6-C30 arylene, a fused C6-C30 cycloalkylene, a C7-C30 arylalkylene, a bridged C7-C30 cycloalkylene, a C1-C20 heteroalkylene, or a cyclic C3-C20 heteroalkylene, and $R^{31b}$ is selected from a C1-C20 alkyl. In one embodiment, $R^{31}$ is an aromatic group substituted with a silane or siloxane group. In one particular embodiment, $R^{31}$ is the following:

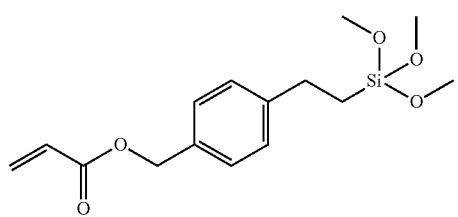 [SMILES: C=CC(=O)OCc1ccc(CC[Si](OC)(OC)OC)cc1]

In one embodiment, the second adhesion promoter (d) is a diacrylate of the formula:

$$CH_2=CR^{32}C(O)O—R^{34}—O(O)CR^{33}C=CH_2 \quad (X)$$

where $R^{32}$ and $R^{33}$ are independently selected from H or a C1-C10 alkyl; and $R^{34}$ is selected from a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylene group, a $C_{6-16}$ arylene group, a C6-C30 bridged cycloalkylene group, or a C12-C36 fused aromatic group.

In one embodiment, the second adhesion promoter is a diacrylate, and R34 is selected from —$B^1$—W—$B^2$—, where $B^1$ and $B^2$ are methylene, and W is

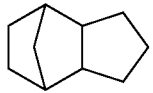

Suitable monofunctional (meth)acrylates (i.e., acrylates or the corresponding methacrylate) include, but are not limited to, linear and branched alkyl acrylates such as methyl acrylate, ethyl acrylate, isopropyl acrylate, n-butyl acrylate, isoamyl acrylate, isooctyl acrylate, hydroxyalkylacrylates, butoxyethyl acrylate, nonylphenoxyethyl acrylate, tetrahydrofurfuryl acrylate, N-methyl pyrrolidone acrylate, 2-ethylhexylacrylate, 2-phenoxyethylacrylate, 2(2-ethoxyethoxy)ethyl acrylate, isodecyl acrylate, isobornyl acrylate, tetrahydrofurfuryl acrylate, N-methyl pyrrolidone acrylate, 2-phenoxyethyl acrylate, 2(2-ethoxyethoxy)ethyl acrylate, isodecyl acrylate, isobornyl acrylate, propoxylated neopentylglycol monomethyl ether acrylate.

Suitable diacrylate functional compounds include, but are not limited to, 1,6-hexanedioldiacrylate, polyolacrylates and polyglycol acrylates such as propoxylated neopentylglycol monomethyl ether acrylate, triethylene glycol diacrylate, tetraethylene glycol diacrylate, neopentyl glycol diacrylate, pentaerythritol triacrylate, trimethylolpropane triacrylate, and tripropylene glycol diacrylate.

The second adhesion promoter may be present in an amount of from about 0.1% to about 10%; from about 0.2% to about 7.5%; from about 0.5% to about 5%; or from about 1% to about 2.5% by weight based on the total weight of the composition.

In embodiments, the first adhesion promoter and the second adhesion promoter are provided such that the mole ratio of hydride to vinyl functional groups may be from about 1.5:1 to about 2.5:1. In one embodiment, the mole ratio of the hydride to vinyl functional groups is 1.5:1; 1.7:1; 1.8:1; 1.9:1 or about 2:1. Here as elsewhere in the specification, numerical values may be combined to form new or non-specified ranges. Applicant has found that when the mole ratio of hydride to vinyl functional groups is below 1.5:1 the system will not cure within the shorter period of time (5 to 15 min)

The alkenyl functional silicone (a) can be an organopolysiloxane having one or more alkenyl groups bonded to a silicon atom. In one embodiment, the composition includes an organopolysiloxane having at least two alkenyl groups bonded to silicon atoms. The composition may include a mixture of two or more different alkenyl functional silicone compounds.

In one embodiment, the composition includes an alkenyl functional silicone compound of the formula:

$$M^1_a M^2_b D^1_c D^2_d T^1_e T^2_f Q_g \quad (XI)$$

wherein:

$M^1 = R^{35} R^{36} R^{37} SiO_{1/2}$ $M^2 = R^{38} R^{39} R^{40} SiO_{1/2}$ $D^1 = R^{41} R^{42} SiO_{2/2}$ $D^2 = R^{43} R^{44} SiO_{2/2}$ $T^1 = R^{45} SiO_{3/2}$ $T^2 = R^{46} SiO_{3/2}$ $Q = SiO_{4/2}$ where $R^{35}$, $R^{36}$, $R^{37}$, $R^{38}$, $R^{39}$, $R^{40}$, $R^{41}$, $R^{42}$, $R^{44}$, and $R^{45}$ are independently chosen from a C1-C30 hydrocarbon, a C6-C30 aromatic group, or C1-C30 alkoxy group;

$R^{38}$, $R^{43}$, and $R^{46}$ are independently chosen from a C1-C30 hydrocarbon, a C6-C30 aromatic group, C1-C30 alkoxy group, or a C2-C30 alkenyl group, with the proviso that one or more of $R^{38}$, $R^{43}$, and/or $R^{46}$ are selected from a C2-C30 alkenyl group;

the subscripts a, b, c, d, e, f, g, are zero or positive subject to the following limitations: 2<a+b+c+d+e+f+g<2000, b+d+f>0.

In one embodiment, the alkenyl functional silicone comprises two or more alkenyl functional groups (i.e., b+d+f>2). In one embodiment, the alkenyl functional silicone is of the formala $M^2 D^1_c M^2$.

Further, it will be appreciated that the composition can include a mixture of two or more alkenyl functional silicones. Where a plurality of alkenyl functional silicones are used, the alkenyl functional silicones may be of different types (e.g., have a different overall makeup in terms of the M, D, T, and Q units), or of different sizes (e.g., have similar M, D, T, Q structures but differ in terms of the number of a particular unit). In one embodiment, the composition comprises a first alkenyl function silicone having the formula $M^2 D^1_c M^2$ where c is from about 5 to about 1000; and a second alkenyl functional silicone having the formula $M^2 D^1_{c'} M^2$ where c' is from about 500 to about 1500.

In one embodiment, the alkenyl functional silicone is a branched, cage-like oligosiloxane containing one or more alkenyl groups bonded to silicon atoms. The branched alkenyl functional silicone includes Q units ($SiO_{4/2}$ units), M units ($R_3SiO_{1/2}$ units), and optionally further including D units ($R_2SiO$ units) and/or T units ($R_3SiO_{3/2}$ units) (wherein R is each independently an unsubstituted or substituted monovalent aliphatic group or alicyclic group), wherein at least three of R's per molecule are preferably alkenyl groups. It will be appreciated that such branched, cage-like siloxanes are encompassed by the alkenyl functional siloxane compound described by formula $M^1_a M^2_b D^1_c D^2_d T^1_e T^2_f Q_g$.

The alkenyl functional silicone (or mixture of two or more alkenyl functional silicones) is present in an amount of from about 40 to about 85 weight %; from about 45 to about 65 weight %; or from about 52 to about 58 weight % based on the total weight of the composition.

The composition includes an organohydrogendpolysiloxane. The organohydrogendpolysiloxane may be chosen from a compound of the formula:

$$M^3{}_h M^4{}_i D^3{}_j D^4{}_k T^3{}_m T^4{}_n Q_o \quad \text{(XII)}$$ wherein:

$$M^3 = R^{47} R^{48} R^{49} SiO_{1/2}$$

$$M^4 = R^{50} R^{51} R^{52} SiO_{1/2}$$

$$D^3 = R^{53} R^{54} SiO_{2/2}$$

$$D^4 = R^{55} R^{56} SiO_{2/2}$$

$$T^3 = R^{57} SiO_{3/2}$$

$$T^4 = R^{58} SiO_{3/2}$$

$$Q = SiO_{4/2}$$

where $R^{47}$, $R^{48}$, $R^{49}$, $R^{53}$, $R^{54}$, $R^{57}$, and are independently chosen from a C1-C30 hydrocarbon, a C6-C30 aromatic group, or C1-C30 alkoxy group;

$R^{50}$, $R^{51}$, $R^{52}$, $R^{55}$, $R^{56}$, and $R^{58}$ are independently chosen from hydrogen, a C1-C30 hydrocarbon, a C6-C30 aromatic group, C1-C30 alkoxy group, or a C2-C30 alkenyl group, with the proviso that one or more of $R^{50}$, $R^{51}$, $R^{52}$, $R^{55}$, $R^{56}$, and/or $R^{58}$ are hydrogen;

the subscripts a, b, c, d, e, f, g, are zero or positive subject to the following limitations: $1 < h+i+j+k+m+n+o < 100$, $i+k+n > 0$.

The hydride functional silicone crosslinker (or mixture of two or more alkenyl functional silicones) is present in an amount of from about 0.01 to about 20 weight %; from about 0.1 to about 5 weight %; or from about 0.1 to about 2 weight % based on the total weight of the composition.

The curable composition optionally further includes an alkoxy silane (e). The alkoxy silane (e) is a compound of the formula:

$$R^{59}\text{—}SiR^{60}{}_n(OR^{61})_{3-n}$$

where $R^{59}$, $R^{60}$, and $R^{61}$ are independently chosen from a C1-C30 hydrocarbon, and/or a C6-C30 aromatic group, and $R^{59}$ is chosen from a C1-C30 hydrocarbon, a C6-30 aromatic group, a C1-C30 alkoxy group, or a C2-C20 unsaturated hydrocarbon.

Examples of suitable alkoxy silanes (e) include, but are not limited to, tetramethoxy silane, tetraethoxy silane, tetra-n-propoxy silane, methoxy triethoxy silane, dimethoxy diethoxy silane, trimethoxy-n-propoxy silane, bis(2-ethylhexoxy)diethoxy silane, methyl trimethoxy silane, methyl triethoxy silane, amyl triethoxy silane, triethoxy silane, methyl triacetoxy silane, phenyl trimethoxy silane, vinyl trimethoxy silane, vinyl triethoxy silane, allyl trimethoxy silane, allyl triethoxy silane, gamma-aminopropyl trimethoxy silane, gamma-aminopropyl triethoxy silane, beta-aminoethyl trimethoxy silane, beta-aminoethyl triethoxy silane, N-beta-aminoethylaminopropyl trimethoxy silane, gamma-isocyanatopropyl triethoxy silane, mercaptopropyl trimethoxy silane, mercaptoethyl trimethoxy silane, mercaptopropyl triethoxy silane, glycidoxypropyl trimethoxy silane, glycidoxypropyl triethoxy silane, 4,5-epoxycyclohexylethyl trimethoxy silane, ureidopropyl trimethoxy silane, ureidopropyl triethoxy silane, chloropropyl trimethoxy silane, chloropropyl triethoxy silane, cyanopropyl trimethoxy silane, etc.

It will be appreciated that two or more different alkoxy silanes may be employed as the alkoxy silane (e). The alkoxy silane, when present, may be present in an amount of about 0.1% to about 5%; from about 0.1% to about 3%; or from about 0.1% to about 2.5% by weight based on the total weight of the composition.

The curable composition optionally includes a filler (f). It is a filler or mixture of fillers that is selected from those that are now known or later found to be useful in silicone compositions, provided they do not significantly impair the translucency of the coating, i.e., that a substrate coated maintains its original appearance following application of the coating thereof Examples of suitable fillers (f) include, but are not limited to, ground, precipitated and colloidal calcium carbonates which are treated with compounds such as stearate or stearic acid; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black, graphite or clays such as kaolin, bentonite, or montmorillonite. In one embodiment, the filler (f) is a silica filler, such as a silica filler treated with a D4 and hexamethyldisilazane or a combination thereof The amount of filler useful in the present invention is generally from about 1 weight % to about 50 weight %, more preferably from about 5 weight % to about 30 weight %, and most preferably from about 8 weight % to about 20 weight % based on the total weight of the curable silicone composition.

The curable composition includes a polymerization inhibitor (g). The polymerization inhibitor is not particularly limited and may be chosen as desired for a particular purpose or intended use. Examples of suitable inhibitors include, but are not limited to, ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated or isolated ene-ynes, hydroperoxides, ketones, sulfoxides, amine, phosphines, phosphites, nitrites, diaziridines, etc. Particularly suitable inhibitors for the compositions are alkynyl alcohols and maleates. Examples of suitable polymerization inhibitors include, but are not limited to, diallyl maleate, hydroquinone, p-methoxyphenol, t-butylcatechol, phenothiazine, etc.

The amount of inhibitor (g) to be used in the compositions can be any amount that will retard the above reaction at room temperature while not preventing said reaction at moderately elevated temperature, i.e. a temperature that is 75 to 100° C. The range of component (g) can be 1 to about 10% weight, about 0.001 to 2% by weight, even about 0.12 to about 1 by weight. Here as elsewhere in the specification and claims, numerical values can be combined to form new and alternative ranges.

The hydrosilylation catalyst (h) can include precious metal catalysts such as, but not limited to, those which use ruthenium, rhodium, palladium, osmium, iridium, and platinum, and complexes of these metals. Examples of suitable hydrosilylation catalysts for use in the present invention include but are not limited to: Ashby catalysts; Lamoreax catalysts; Karstedt catalysts; Modic catalysts; and Jeram catalysts and combinations of two or more thereof The curable composition may also comprise other additives (i). Other additives may include, but are not limited to, an antioxidant, a filler, pigments, dyes, filler treating agent, plasticizer, spacer, extender, biocide, stabilizer, flame retardant, surface modifier, anti-aging additive, rheological additive, corrosion inhibitor, surfactant or combination thereof The curable compositions may also include an antioxidant compound. Examples of suitable classes of antioxidant compounds include, but are not limited to, hindered amines and/or hindered phenol compounds.

Examples of hindered amine antioxidant compounds include, but are not limited to Hindered amine series antioxidant (N,N',N'',N'''-tetrakis-(4,6-bis(butyl-(N-methy)-2,2,6,6-tetramethylpiperidin-4-yl)amino)-triazine-2-yl)-4,7-diazadecan-1,10-diamine, a polycondensation product of dibutylamine-1,3,5-triazine-N,N'-bis-(2,2,6,6-tetramethyl-4-pipendyl-1,6-hexamethylenediamine-N-(2,2,6,6-tetramethyl-4-piperidyl)butylamine, poly [{6-(1,1,3,3-tetramethylbutyl)amino-1,3,5-triazine-2,4-diyl}{(2,2,6,6-tetramethyl-4-piperidyl)imino}hexamethylene1{(2,2,6,6-tetramethyl-4-piperidyl)imino}], a polymer of dimethyl succinate and 4-hydroxy-2,2,6,6-tetramethyl-1 -piperidinethanol, [a reaction product of decanedioic acid bis(2,2,6,6-tetramethyl-1 (octyloxy)-4-piperidyl) ester, 1,1 -dimethylethylhydroperoxide and octane] (70%)-polypropylene (30%), bis(1,2,2,6,6-pentamethyl-4-piperidyl)[[3,5-bis(1,1-dimethyl ethyl)-4-hydroxyphenyl] methyl] butylmalonate, methyl 1,2,2, 6,6-pentamethyl-4piperidylsebacate, bis(2,2,6,6-tetramethyl-4-piperidyl)sebacate, bis(1,2,2,6,6-pentamethyl-4-piperidyl) sebacate, 1-[2-[3-(3,5 -di-tert-butyl-4-hydroxyphenyl) propionyloxy] ethyl]-4-[3-(3, 5-di-tert-butyl-4-hydroxyphenyl)propionyloxy]-2,2,6,6-tetramethylpiperidine, 4-benzoyloxy-2,2,6,6-tetramethylpiperidine, 8-acetyl-3 -dodecyl-7,7,9,9-tetramethyl-1,3,8-triazaspiro [4.5]decan-2,4-dione, etc.).

In one embodiment, the antioxidant compound is a hindered phenolic compound. The hindered phenol can be chosen as desired for a particular purpose or intended application. Examples of suitable hindered phenols include, but are not limited to, monophenols such as 2,6-di-t-butyl-p-cresol, 2-t-butyl-4-methoxyphenol, 3-t-butyl-4-methoxyphenol, and 2,6-t-butyl-4-ethylphenol, bisphenols such as 2,2'-methylene-bis(4-methyl-6-t-butylphenol), 4,4'-thiobis (3-methyl-6-t-butylphenol), and 4,4'-butylidene-bis(3-methyl-6-t-butylphenol); and polymeric phenols such as 1,1,3-tris(2-methyl-4-hydroxy-5-t-butylphenyl)butane, 1,3,5 -trimethyl-2,4,6-tri s(3 ,5 -di-t-butyl-4-hydroxybenzyl) benzene, tetrakis[methylene-3-(3,5 ¹-di-t-butyl-4'-hydroxyphenyl)propionate]methane, bis[3,3'-bis(4'-hydroxy-3-t-butylphenyl)butyric acid glycol ester, and tocopherol (vitamin E), pentaerythritol-tetrakis[3-(3,5-di-tert- butyl-4-hydroxyphenyl)propionate], thiodiethylene-bis[3 -(3,5 -di-tert-butyl-4-hydroxyphenyl)propionate], octadecyl-3-(3,5-di-tert-butyl-4-hydroxyphenyl)propinate), N,N'-hexane-1,6-diylbis[3-(3,5-di-tert-butyl-4-hydroxyphenylpropioamide), benzenepropanoic acid 3,5 -bis(1,1 -dimethylethyl)-4-hydroxy C7-C9 side chain alkyl ester, 2,4-dimethyl-6-(1-methylpentadecyl)phenol, diethyl[[3,5 -bis(1,1-dimethyl ethyl)-4-hydroxyphenyl]methyl]phosphonate, 3,3', 3", 5,5',5"-hexane-tert-butyl-4-a, a',a"-(mesitylene-2,4,6-toly)tri-p-cresol, calcium diethylbis[[[3, 5-bis-(1,1-dimethylethyl)-4-hy droxyphenyl]methyl]phosphonate], 4,6-bis (octylthiomethyl)-o-cresol, ethylenebis(oxyethylene)bi s [3 -(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, a reaction product of N-phenylbenzeneamine and 2,4,4-trimethylpentene, 2,6-di-tert-butyl-4-(4,6-bis(octylthio)-1,3,5-triazine-2-ylamino)phenol etc.).

IRGANOX 1330 is a sterically hindered phenolic antioxidant ("3,3', 3', 5', 5', 5'-hexa-tert-butyl-a, a', a'-(mesitylene-2,4,6-triyl)tri-p-cresol") commercially available from BASF. Irganox 1010 is a sterically hindered phenolic antioxidant ("Pentaerythritol Tetrakis(3-(3,5-di-tert-butyl-4-hydroxyphenyl)propionate)") commercially available from BASF, or 1,3,5-trimethyl-2,4,6-tris (3,5-di-tert-butyl-4-hydroxybenzyl) benzene commercially available as ETHANOXTM™ 330 (Albemarle Corporation), pentaerythritol tetrakis[3-(3,5-di-tert-butyl-4-hydroxyphenyl)propinate] (Irganox 1010), tris(3,5 -di-tert-butyl-4-hydroxybenzyl) isocyanurate (Irganox 3114), tris(3,5-di-tert-butyl-4-hydroxybenzyl) isocyanurate as Irganox 3114.

The curable composition may optionally comprise a photostabilizer. The photostabilizer is not particularly limited and may be chosen as desired for a particular application or intended use. Examples of suitable materials for the photstabilizer include, but are not limited to, 2,4-di-tert-butyl-6-(5-chlorobenzotriazol- 2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, a reaction product of methyl 3-(3-(21-1-benzotriazol-2-yl)-5-tert-butyl-4-hydroxyphenyl)propionate/polyethylene glycol 300, 2-(2H-benzotriazol-2-yl)-6-(straight and branched dodecyl)-4-methylphenol, 2-(4,6-diphenyl-1,3,5-triazine-2-yl)-5- [(hexyl)oxy]-phenol, octabenzone, 2,4-di-tert-butylphenyl-3,5-di-tert-butyl-4-hydroxybenzoate, tinuvin 622LD, Tinuvin 144, CHIMASSORB 119FL, MARK LA-57, LA-62, LA-67, LA-63, SANDOL LS-765, LS-292, LS-2626, LS-1114, LS-744, etc.

The curable compositions may be cured by providing a mixture of the respective components and exposing the mixture to a sufficient temperature for a sufficient time to cure the composition. The respective components may be added separately or as two or more packages of materials where a package includes two or more of the components required for the final composition. In one embodiment, the adhesion promoters are provided as a package including (i) the first adhesion promoter and (ii) the second adhesion promoter. In one embodiment, the composition may be heated at a temperature below 150° C.; below 125 °C.; below 110° C.; below 100° C.; or below 90° C. In one embodiment, the composition is heated at a temperature of from about 75 °C. to about 120° C.; from about 85 °C. to about 110° C.; or from about 90° C. to about 100° C. Curing may be accomplished under exposure to an elevated temperature for a period of from about 5 minutes to about 20 minutes; 5 minutes to about 15 minutes; or about 10 minutes to about 15 minutes. In still another embodiment, curing can be accomplished by heating at 80° C. to 100° C. for 5 to 15 minutes. In embodiments, curing can be accomplished at 100° C. in as little as five minutes.

The compositions may be used in a variety of applications. In embodiments, the compositions may be cured and used as materials for sealing, as adhesives; as coatings in sanitary rooms; as joint seal between different materials, e.g., sealants between ceramic or mineral surfaces and thermoplastics; as paper release; as impregnation materials; weather strip coatings, release coatings, adhesives, adhesion finishes, leak tight products, pointing products, foams, etc. As examples, the compositions can be cured and used as a general purpose and industrial sealant, potting compound, caulk, or adhesive for construction use, insulated glass, where glass sheets are fixed and sealed in metal frame; caulks, adhesives for metal plates, car bodies, vehicles, electronic devices, and the like.

Further, the compositions may be employed on a variety of substrates and provide excellent adhesive properties. Examples of suitable substrates include, polymeric substrates that may include, but are not limited to, organic polymeric materials such thermoplastic resin selected from acrylonitrile-butadiene-styrene (ABS) resin, polycarbonate (PC) resin, styrene resin, acrylic resin, polyethylene terephthalate (PET) resin, polybuthylene terephthalate (PBT) resin, polyphenylene oxide (PPO) resin, polyphenylene sulfide (PPS) resin, polysulfone resin, nylon (PA) resin, aromatic polyamide (aromatic PA) resin, polyimide (PI) resin, and liquid crystal resin. The compositions also can be used to adhere to metal substrates including aluminum, iron, nickel, stainless steel, metal alloys, and plated metal.

The following examples are intended to illustrate aspects and embodiments of the present technology. All parts and percentages are by weight and all temperatures are in Celsius unless explicitly stated otherwise. All patents, other publications, and U.S. patent applications referred to in the instant application are incorporated herein by reference in their entireties.

EXAMPLES

Compositions were prepared according to the examples listed in Table 1-3. The compositions were prepared by adding the adhesion promoter(s) to the compositions and mixing to disperse into the composition. The hydride silane adhesion promoter identified as BPA Derivative is a silane falling under formula (I) containing cyclic hydrido siloxane and an —O—Ar—O—group is

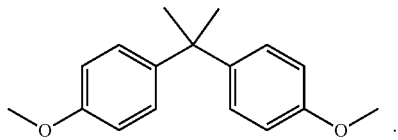

The hydride alkoxy silane adhesion promoter Silane A is a silane falling under the formula $R^{23}$—$SiR^{24}_r(OR^{25})_{3-r}$ where $R^{23}$ is a cyclic hydrido siloxane having a group $Q^1$-C(O)—O-$Q^2$ attached thereto as described in the specification. The acrylate based adhesion promoter is selected from a monoacrylate functional acrylate based adhesion promoter or a diacrylate functional acrylate based adhesion promoter. The monacrylate functional acrylate based adhesion promoter is:

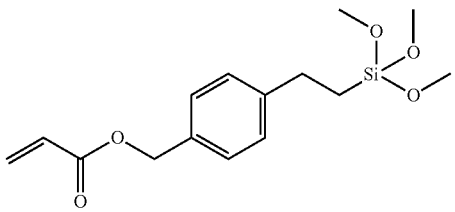 [SMILES: C=CC(=O)OCc1ccc(CC[Si](OC)(OC)OC)cc1]

The diacrylate functional acrylate based adhesion promoter is:

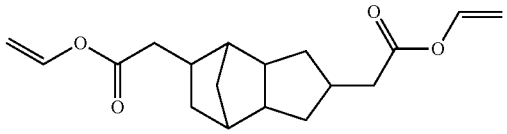

The compositions were applied to a surface of a polycarbonate (PC) substrate, a polyphenylene sulfide (PPS) substrate, or a polybutylene terephthalate (PBT) substrate within a Teflon groove having dimensions of 145 mm²×0.15 mm deep. The substrates were placed in an oven and cured at (i) 100° C. for 5 minutes; (ii) 90° C. for 10 minutes; and (iii) 80° C. for 15 minutes. Lap shear strength of the cured material was measured using an INSTRON 3365 tensile strength tester a test method ASTM D 3163.

TABLE 1

| | | | 1 | 2 | 3 | 4 | 5 | 6 |
|---|---|---|---|---|---|---|---|---|
| Vinyl Polymer | A-1 | $M^{Vi}D_{1000}M^{Vi}$ | 53 | 53 | 53 | 53 | 53 | 53 |
| | A-2 | $M^{Vi}D_{500}M^{Vi}$ | 10 | 10 | 10 | 10 | 10 | 10 |
| | B-1 | $M_6M^{Vi}Q_8$ | 15 | 15 | 15 | 15 | 15 | 15 |
| Si—H Cross Linker | E-1 | $MD^H_{28}D_{20}M$ | 2 | 2 | 2 | 2 | 2 | 2 |
| Filler | C-1 | HMDZ treated Fumed Silica (200 m³/g) | 12 | 12 | 12 | 12 | 12 | 12 |
| Si—H -AP | D-1 | Silane A | — | 4.35 | 3.77 | 3.7 | | 3.6 |
| | D-2 | BPA Derivative | 4 | | 2 | 1 | 3.1 | |
| Acrylate-AP | F-1 | Monoacrylate AP | — | — | — | 3.1 | 3.1 | 1.9 |
| | F-2 | Diacrylate AP | 2.25 | 1.25 | 2.25 | — | | |
| Inhibitor | G-1 | Diallyl Maleate | 0.05 | 0.05 | 0.05 | 0.05 | 0.05 | 0.05 |
| Catalyst | H | Pt-Catalyst Pt($M^{Vi}$)$_2$ | 2 | 2 | 2 | 2 | 2 | 2 |
| | | Total | 100.3 | 99.6 | 102 | 101 | 100 | 99.0 |
| Lap Shear Strength (MPa) 100° C. for 5 min | | PC | 4.89 | 2.4 | 2.19 | 0.5 | 3.9 | 2.7 |
| | | PBT | 4.14 | 2.33 | 3.08 | 2.4 | 4.0 | 2.3 |
| | | PPS | 1.55 | 2.32 | 2.74 | 1.51 | 0.8 | 0.8 |
| Lap Shear Strength (MPa) 90° C. for 10 min | | PBT | 4.9 | 2.1 | 2.4 | ND | ND | ND |
| | | PPS | 3 | 2 | 1.7 | ND | ND | ND |
| Lap Shear Strength (MPa) 80° C. for 15 min | | PBT | 4 | 2.3 | 2.4 | ND | ND | ND |
| | | PPS | 1.4 | 1.6 | 2.3 | ND | ND | ND |

ND—Not determined

TABLE 2

Comparative Examples

| | | | C1 | C2 | C3 | C4 |
|---|---|---|---|---|---|---|
| Vinyl Polymer | A-1 | $M^{Vi}D_{1000}M^{Vi}$ | 53 | 53 | 53 | 53 |
| | A-2 | $M^{Vi}D_{500}M^{Vi}$ | 10 | 10 | 10 | 10 |
| | B-1 | $M_6M^{Vi}Q_8$ | 15 | 15 | 15 | 15 |
| Si—H Cross Linker | E-1 | $MD^H{}_{28}D_{20}M$ | 2 | 2 | 2 | 2 |
| Filler | C-1 | HMDZ treated Fumed Silica (200 m³/g) | 12 | 12 | 12 | 12 |
| Si—H -AP | D-1 | Silane A | 3 | — | — | — |
| | D-2 | BPA Derivative | — | 3 | — | — |
| Acrylate-AP | F-1 | Monoacrylate AP | — | — | 3 | — |
| | F-2 | Diacrylate AP | — | — | — | 3 |
| Inhibitor | G-1 | Diallyl Maleate | 0.05 | 0.05 | 0.05 | 0.05 |
| Catalyst | H | Pt-Catalyst $Pt(M^{Vi})_2$ | 2 | 2 | 2 | 2 |
| Lap Shear Strength (MPa) 100° C. for 5 min | | PC | | | Adhesive failure | |
| | | PBT | | | | |
| | | PPS | | | | |
| Lap Shear Strength (MPa) 90° C. for 10 min | | PBT | | | | |
| | | PPS | | | | |
| Lap Shear Strength (MPa) 80° C. for 15 min | | PBT | | | | |
| | | PPS | | | | |
| | | PBT | | | | |
| | | PPS | | | | |
| Lap Shear Strength (MPa) 90° C. for 15 min | | PBT | | | | |
| | | PPS | | | | |
| Lap Shear Strength (MPa) 80° C. for 30 min | | PBT | | | | |
| | | PPS | | | | |

TABLE 3

Adhesion Data Comparison at Different Temperature

| | | | 1 | 3 |
|---|---|---|---|---|
| Vinyl Polymer | A-1 | $M^{Vi}D_{1000}M^{Vi}$ | 53 | 53 |
| | A-2 | $M^{Vi}D_{500}M^{Vi}$ | 10 | 10 |
| | B-1 | $M_6M^{Vi}Q_8$ | 15 | 15 |
| Si—H Cross Linker | E-1 | $MD^H{}_{28}D_{20}M$ | 2 | 2 |
| Filler | C-1 | HMDZ treated Fumed Silica (200 m³/g) | 12 | 12 |
| Si—H -AP | D-1 | Silane A | — | 3.9 |
| | D-2 | BPA Derivative | 4 | 2 |
| Acrylate-AP | F-1 | Monoacrylate AP | — | — |
| | F-2 | Diacrylate AP | 2.25 | 2.25 |
| Inhibitor | G-1 | Diallyl Maleate | 0.05 | 0.05 |
| Catalyst | H | Pt-Catalyst $Pt(M^{Vi})_2$ | 2 | 2 |
| | | | 100.3 | 102 |
| Lap Shear Strength (MPa) 100° C. for 5 min | | PBT | 4.8 | 2.9 |
| | | PPS | 0.8 | 2.3 |
| Lap Shear Strength (MPa) 100° C. for 15 min | | PBT | 5.2 | 2.7 |
| | | PPS | 4.01 | 3.9 |
| Lap Shear Strength (MPa) 100° C. for 30 min | | PBT | 4.9 | 3.5 |
| | | PPS | 4.4 | 4.5 |

As illustrated in the Table 1, the present adhesion promoters provide good adhesion compared to the use of either the hydride or the acrylate based adhesion promoters alone. Additionally, the use of the hydride based and acrylate adhesion promoters in conjunction with one another provides improved adhesion across a broader spectrum of substrates. Cohesive failure was observed for the compositions of Examples 1-6. In contrast, the comparative examples shown in Table 2 exhibited adhesive failure, which is generally an undesirable mode of failure in an adhesive system. Further, the combination of adhesion promoter provides a composition that can be cured at low temperatures (e.g., 100° C. or lower) in a very short amount of time (e.g., in 15 minutes or less, even in about 5 minutes).

Adhesion at 100° C. for five minutes is confirmed by heating at 100° C. for longer periods of time (e.g., 15 minutes or 30 minutes). Table 3 shows that the adhesion values for the longer cure times showed no substantial change relative to curing for five minutes. This demonstrates that curing is complete in five minutes.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of an aromatic-containing silicone compound and curable compositions comprising such compounds. Modifications may occur to those skilled in the art and to those who may make and use the invention. The disclosed embodiments are merely for illustrative purposes and not intended to limit the scope of the invention or the subject matter set forth in the claims.

What is claimed is:

1. A curable silicone composition comprising: (a) an alkenyl functional silicone; (b) a silicone based cross linker; (c) a first adhesion promoter selected from a silicon hydride containing adhesion promoter having at least one Si—H group; (d) a second adhesion promoter selected from an acrylate functional adhesion promoter; (e) optionally, a silane; (f) optionally, a filler; (g) an inhibitor; and (h) a catalyst, wherein the first adhesion promoter and the second adhesion promoter are present in an amount such that there is a molar ratio of Si—H to ethylenically-unsaturated groups from the first and second adhesion promoters of from 1.5:1 to 2.5:1.

2. The curable silicone composition of claim 1, wherein the first adhesion promoter is selected from a compound of the formula (I):

where $R^1$ and $R^2$ are a C1-C30 divalent hydrocarbon; a C2-C20 divalent hydrocarbon; a C4-C10 divalent hydrocarbon; or a C1-C4 divalent hydrocarbon;

$Z^1$ and $Z^2$ are independently:

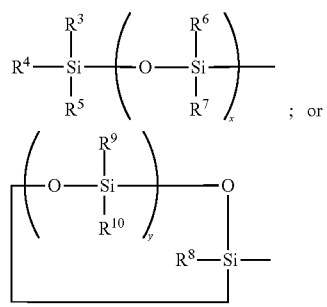

where $R^3$, $R^4$, $R^5$, $R^6$, $R^7$, $R^8$, R9, and $R^{10}$ are independently chosen from H, a C1-C10 alkyl, or —OR11, where $R^{11}$ is a C1-C10 alkyl, and at least one of $R^3$, $R^4$, $R^5$, $R^6$, $R^7$, $R^8$, $R^9$, and/or $R^{10}$ are H;

X is 1 to 10;
Y is 2 to 10; and
Ar is an aromatic group.

3. The curable silicone composition of claim 2, wherein the aromatic group Ar may be chosen from a C6-C30 arylene group, or a group of the formula —$Ar^1$—X—$Ar^2$—, where $Ar^1$ and $Ar^2$ are independently chosen from a monocyclic divalent aryl group and X is a bridging group.

4. The curable silicone composition of claim 3, wherein $Ar^1$ and $Ar^2$ are independently chosen from a C6-C30 arylene group, X is chosen from a bond connecting $Ar^1$ and $Ar^2$, a C1-C30 divalent hydrocarbon group, a C5-C30 divalent cyclic hydrocarbon group, —O—, —S—, —S(O)—, —S(O)$_2$—, or —C(O)—.

5. The curable silicone composition of claim 3, wherein $Ar^1$—X—$Ar^2$ is a group of the formula:

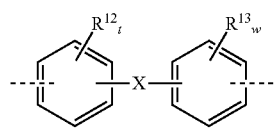

where X is chosen from a bond connecting $Ar^1$ and $Ar^2$, a C1-C30 divalent hydrocarbon group, a C5-C30 divalent cyclic hydrocarbon group, —O—, —S—, —S(O)—, —S(O)$_2$—, or —C(O)—;, $R^{12}$ and $R^{13}$ are the same or different from each other or within the ring to which they are attached and are chosen from hydrogen, a C1-C10 alkyl, C1-C10 alkoxy, a C2-C8 alkenyl, a C2-C8 alkenyloxy, a C3-C8 cycloalkyl, a C3-C8 cycloalkoxy, a C6-C10 aryl, a C6-C10 aryloxy, a C7-C10 aralkoxy, a C7-C12 alkylaryl, or a C7-C12 alkylaryloxy, and t and w are 0-4, wherein when t or w are less than 4, the unspecified valence or valencies is occupied by hydrogen.

6. The curable silicone composition of claim 3, wherein —$Ar^1$—X—$Ar^2$ is of the formula:

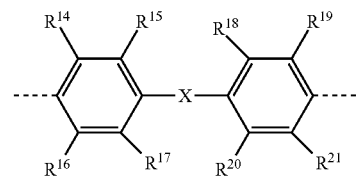

where X is as described above, and $R^{14}$, $R^{15}$, $R^{16}$, $R^{17}$, $R^{18}$, $R^{19}$, $R^{20}$, and $R^{21}$ are independently selected from hydrogen, a C1-C10 alkyl, a C3-C8 cycloalkyl, or a C6-C10 aryl.

7. The curable silicone composition of claim 6, wherein X is —$C(R^{22})_2$— where $R_{22}$ is independently selected from hydrogen, a C1-C10 alkyl, a C3-C8 cycloalkyl, or a C6-C10 aryl.

8. The curable silicone composition of claim 7, wherein $Z^1$ and $Z^2$ in Formula (I) are:

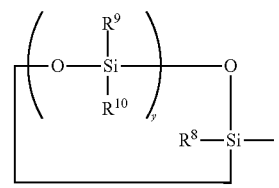

9. The curable silicone composition of claim 2, wherein the O—Ar—O in Formula (I) is:

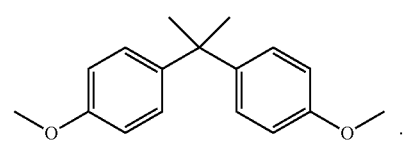

10. The curable silicone composition of claim 1, wherein the first adhesion promoter is selected from a compound of the formula (VI):

where $R^{23}$ is a hydrogen or hydride functional group; $R^{24}$ is independently selected from a C1-C10 hydrocarbon group; each $R^{25}$ is independently selected from a C1-C10 hydrocarbon; and r=0, 1, or 2.

11. The curable composition of claim 10, wherein $R^{23}$ is a cyclic hydrido siloxane containing group of the formula (VII):

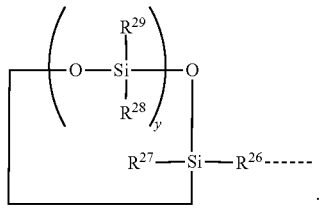

(VII)

where $R^{27}$, $R^{28}$, and $R^{29}$ are independently chosen from H, a C1-C10 alkyl, or —$OR^{30}$, where $R^{54}$ is a C1-C10 alkyl, and at least one of $R^{27}$, $R^{28}$, and $R^{29}$ are H; and $R^{26}$ is a divalent C1-C30 hydrocarbon; a divalent C6-C30 aryl group; or a divalent ester group.

12. The curable composition of claim 11, wherein $R^{23}$ is a cyclic hydrido siloxane of formula (VII), and $R^{26}$ is represented by the following formula $Q^1$-C(O)—O-$Q^2$ wherein:
$Q^1$ represents a linear or branched alkylene group that forms a carbon chain having two or more carbon atoms between the silicon atom and an ester bond, in embodiments 2-20 carbon atoms, 4-15 carbon atoms, or 6-10 carbon atoms, and
$Q^2$ represents a linear or branched alkylene group that forms a carbon chain having three or more carbon atoms between an oxygen atom and a silicon atom.

13. The curable composition of claim 2 wherein the first adhesion promoter (c) comprises (i) an adhesion promoter of formula (I), and (ii) an adhesion promoter of formula (VI):

$R^{23}$—Si$R^{24}_r$(O$R^{25}$)$_{3-r}$     (VI)

where $R^{23}$ is a hydrogen or hydride functional group; $R^{24}$ is independently selected from a C1-C10 hydrocarbon group; each $R^{25}$ is independently selected from a C1-C10 hydrocarbon; and r=0, 1, or 2.

14. The curable composition of claim 1, wherein the second adhesion promoter is selected from:
(i) a compound of the formula CH2=C$R^{30}$C(O)O—$R^{31}$ where $R^{30}$ is selected from H or a C1-C10 alkyl; and $R^{31}$ is selected from a C1-C20 alkyl, a C3-C20 cycloalkyl, a C6-C30 aryl, a fused C6-C30 cycloalkyl, a C7-C30 arylalkyl, a bridged C7-C30 cycloalkyl, a C1-C20 heteroalkyl, or a cyclic C3-C20 heteroalkyl, where the $R^{31}$ groups may optionally contain a heteroatom or a heteroatom-containing functional group; and/or
(ii) a compound of the formula CH2=C$R^{32}$C(O)O—$R^{34}$—O(O)C$R^{33}$C=CH2 where $R^{32}$ and $R^{33}$ are independently selected from H or a C1-C10 alkyl; and $R^{34}$ is selected from a C1-18 alkylene group, a C3-18 cycloalkylene group, a fused C6-18 cycloalkylene group, or a group of the formula —$B^1$—W—$B^2$— wherein $B^1$ and $B^2$ are the same or different C1-6 alkylene group and W is a C3-12 cycloalkylene group, a C6-16 arylene group, a C6-C30 bridged cycloalkylene group, or a C12-C36 fused aromatic group.

15. The curable composition of claim 1, wherein the first adhesion promoter is present in an amount of from about 0.1 wt. % to about 10 wt. % based on the total weight of the composition; and the second adhesion promoter is present in an amount of from about 0.1 wt. % to about 10 wt. % based on the total weight of the composition.

16. The curable composition of claim 1, wherein the first adhesion promoter and the second adhesion promoter are present in an amount such that there is a molar ratio of Si—H to vinyl groups from the first and second adhesion promoters of 2:1.

17. The curable silicone composition of claim 1, wherein the alkenyl silicone is chosen from a compound of the formula $M^1_a M^2_b D^1_c D^2_d T^1_e T^2_f Q_g$ wherein:

$M^1 = R^{35}R^{36}R^{37}SiO_{1/2}$ $M^2 = R^{38}R^{39}R^{40}SiO_{1/2}$ $D^1 = R^{41}R^{42}SiO_{2/2}$ $D^2 = R^{43}R^{44}SiO_{2/2}$ $T^1 = R^{45}SiO_{3/2}$ $T^2 = R^{46}SiO_{3/2}$ $Q = SiO_{4/2}$ where $R^{35}$, $R^{36}$, $R^{37}$, $R^{39}$, $R^{40}$, $R^{41}$, $R^{42}$, $R^{44}$, and $R^{45}$ are independently chosen from a C1-C30 hydrocarbon, a C6-C30 aromatic group, or C1-C30 alkoxy group;
$R^{38}$, $R^{43}$, and $R^{46}$ are independently chosen from a C1-C30 hydrocarbon, a C6-C30 aromatic group, C1-C30 alkoxy group, or a C2-C30 alkenyl group, with the proviso that one or more of $R^{38}$, $R^{43}$, and/or $R^{46}$ are selected from a C2-C30 alkenyl group;
the subscripts a, b, c, d, e, f, g, are zero or positive subject to the following limitations: 2<a+b+c+d+e+f+g<2000, b+d+f>0.

18. The curable silicone composition of claim 17, wherein the alkenyl silicone comprises a mixture of alkenyl silicones chosen from (i) a first alkenyl function silicone having the formula $M^2D^1_cM^2$ where c is from about 5 to about 1000; and a (ii) second alkenyl functional silicone having the formula $M^2D^1_{c'}M^2$ where c' is from about 500 to about 1500.

19. The curable composition of claim 17, wherein the alkenyl silicone is a branched polyorganosiloxane comprising a plurality of $Q_g$ units and one or more $M^2$ units.

20. The curable silicone composition of claim 1, wherein the silicone hydride crosslinker is chosen from a compound of the formula:

$M^3_h M^4_i D^3_j D^4_k T^3_m T^4_n Q_o$ wherein:

$M^3 = R^{47}R^{48}R^{49}SiO_{1/2}$ $M^4 = R^{50}R^{51}R^{52}SiO_{1/2}$ $D^3 = R^{53}R^{54}SiO_{2/2}$ $D^4 = R^{55}R^{56}SiO_{2/2}$ $T^3 = R^{57}SiO_{3/2}$ $T^4 = R^{58}SiO_{3/2}$ $Q = SiO_{4/2}$ where $R^{47}$, $R^{48}$, $R^{49}$, $R^{53}$, $R^{54}$, $R^{57}$, and are independently chosen from a C1-C30 hydrocarbon, a C6-C30 aromatic group, or C1-C30 alkoxy group;
$R^{50}$, $R^{51}$, $R^{52}$, $R^{55}$, $R^{56}$, and $R^{58}$ are independently chosen from hydrogen, a C1-C30 hydrocarbon, a C6-C30 aromatic group, C1-C30 alkoxy group, or a C2-C30 alkenyl group, with the proviso that one or more of $R^{50}$, $R^{51}$, $R^{52}$, $R^{55}$, $R^{56}$, and/or $R^{58}$ are hydrogen;

the subscripts a, b, c, d, e, f, g, are zero or positive subject to the following limitations: $1 \leq h+i+j+k+m+n+o \leq 100$, $i+k+n>0$.

21. The curable silicone composition of claim 1 comprising the filler (f) in an amount of from about 1 weight % to about 50 weight % based on the total weight of the curable silicone composition.

22. The curable composition of claim 21, wherein the filler is selected from precipitated calcium carbonate, colloidal calcium carbonate, fumed silica, precipitated silica, silica gel, hydrophobized silica, a hydrophobized silica gelm crushed quartz, ground quartz, alumina, aluminum hydroxide, titanium hydroxide, diatomaceous earth, iron oxide, carbon black, graphite, a clay.

23. A cured silicone material formed from the composition of claim 1.

24. A method of forming an adhesive coating on a substrate comprising:
applying a curable composition of claim 1 to a surface of a substrate, and heating the composition at a temperature of about 80° C. to about 100° C.

25. The method of claim 24, wherein the composition is cured over a period of 5 minutes to about 15 minutes.

26. The method of claim 24 comprising heating the composition at a temperature of about 100° C. for 5 minutes.

27. The method of claim 24, wherein the substrate is chosen from a plastic material, metal, metal alloys, metallized plastic, and/or coated or painted metal.

28. A curable silicone composition comprising: (a) an alkenyl functional silicone; (b) a silicone based cross linker; (c) a first adhesion promoter selected from a silicon hydride containing adhesion promoter having at least one Si—H group; (d) a second adhesion promoter selected from an acrylate functional adhesion promoter; (e) optionally, a silane; (f) optionally, a filler; (g) an inhibitor; and (h) a catalyst;

wherein the first adhesion promoter (c) comprises (i) an adhesion promoter of formula (I), and (ii) an adhesion promoter of formula (VI):

$$Z^1—R^1—O—Ar—O—R^2—Z^2 \quad (I)$$

where $R^1$ and $R^2$ are a C1-C30 divalent hydrocarbon; a C2-C20 divalent hydrocarbon; a C4-C10 divalent hydrocarbon; or a C1-C4 divalent hydrocarbon;

$Z^1$ and $Z^2$ are independently:

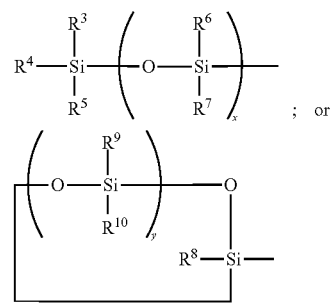

; or where $R^3$, $R^4$, $R^5$, $R^6$, $R^7$, $R^8$, $R^9$, and $R^{10}$ are independently chosen from H, a C1-C10 alkyl, or —OR11, where $R^{11}$ is a C1-C10 alkyl, and at least one of $R^3$, $R^4$, $R^5$, $R^6$, $R^7$, $R^8$, $R^9$, and/or $R^{10}$ are H;

X is 1 to 10;
Y is 2 to 10; and
Ar is an aromatic group;

$$R^{23}—SiR^{24}_r(OR^{25})_{3-r} \quad (VI)$$

where $R^{23}$ is a hydrogen or hydride functional group; $R^{24}$ is independently selected from a C1-C10 hydrocarbon group; each $R^{25}$ is independently selected from a C1-C10 hydrocarbon; and r=0, 1, or 2.

* * * * *